(12) United States Patent
Fujita et al.

(10) Patent No.: US 6,373,400 B1
(45) Date of Patent: Apr. 16, 2002

(54) VEHICLE-MOUNTED DISPLAY DEVICE

(75) Inventors: Yasuhiko Fujita; Ryo Chijimatsu; Satoru Watanabe, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/642,579

(22) Filed: Aug. 22, 2000

(30) Foreign Application Priority Data

Aug. 31, 1999 (JP) .......................................... 11-244544

(51) Int. Cl.⁷ ................................................ G08G 1/00
(52) U.S. Cl. ........................ 340/901; 340/903; 340/904
(58) Field of Search ................................. 340/903, 901, 340/904, 525, 990, 995; 180/167; 701/118

(56) References Cited

U.S. PATENT DOCUMENTS

| | | | | |
|---|---|---|---|---|
| 4,293,843 A | * | 10/1981 | Bertoloni et al. | 340/52 F |
| 5,091,726 A | * | 2/1992 | Shyu | 340/904 |
| 5,349,430 A | * | 9/1994 | Yamamoto et al. | 340/903 |
| 6,119,068 A | * | 9/2000 | Kannonji | 340/903 |
| 6,150,956 A | * | 11/2000 | Laufer | 340/903 |

FOREIGN PATENT DOCUMENTS

JP        11-42957        2/1999

* cited by examiner

Primary Examiner—John Tweel
(74) Attorney, Agent, or Firm—Arent Fox Kintner Plotkin & Kahn PLLC (57) ABSTRACT

A display device on a meter panel of an automobile, indicates the following distance from a vehicle to a preceding vehicle by displaying multiple blocks, and recognition of the following distance is made easy thus preventing erroneous recognition. The display includes three blocks and three sub-blocks between a vehicle symbol and a preceding vehicle symbol. The three blocks can be switched between a display state and a non-display state and the three sub-blocks are constantly in a display state. The blocks and sub-blocks are positioned so as to correspond to each other. When all three blocks are in a display state, this denotes that the following distance is 'long', when two of the blocks are in a display state, it denotes that the following distance is 'medium' and when only one block is in a display state, it denotes that the following distance is 'short'.

4 Claims, 8 Drawing Sheets

'LONG' FOLLOWING DISTANCE

FIG.6B

'MEDIUM' FOLLOWING DISTANCE

FIG.6C

'SHORT' FOLLOWING DISTANCE

VEHICLE-MOUNTED DISPLAY DEVICE

BACKGROUND OF THE INVENTION

1. Field of the Invention

The present invention relates to vehicle-mounted display devices for displaying the following distance of a vehicle from a preceding vehicle by means of the status of multiple blocks which are arranged in the direction of the following distance.

2. Description of the Prior Art

A vehicle-mounted display device is disclosed in Japanese Patent Application Laid-open No. 11-42957. The prior art display device is a liquid crystal display device provided on a meter panel which enables the driver to recognize the target following distance of the vehicle from a preceding vehicle in a system in which the vehicle is driven so as to track the preceding vehicle, while maintaining a predetermined following distance from the preceding vehicle. Three blocks which can be switched between a display state and a non-display state, are placed between a symbol for the preceding vehicle and a symbol for the vehicle, and by switching three blocks to a display state in the case of a 'long' target following distance, two blocks to a display state in the case of a 'medium' target following distance and one block to a display state in the case of a 'short' target following distance, the driver can recognize the target following distance at a glance.

The above-described conventional vehicle-mounted display device shows the target following distance by means of the number of blocks that are in a display state, but there is the problem, for example, where all three blocks are in a display state suggesting that the target following distance is 'long', if the driver does not recognize that the total number of blocks is 3, it is difficult to quickly judge that it shows a 'long' target following distance. In particular, when the number of blocks in the display state decreases, since the positions of the preceding vehicle symbol and vehicle symbol approach each other accordingly, it becomes difficult for the driver to recognize the total number of blocks and thus the possibility of erroneous recognition occurring increases. More particularly, when the driver has an erroneous recognition that the total number of blocks is 4 or 5, there is a possibility that a state in which three blocks are displayed might be recognized as a 'medium' target following distance.

SUMMARY OF THE INVENTION

The present invention has been made in view of the above circumstances, and it is an object of the present invention to prevent erroneous recognition by providing easy recognition of the following distance of a vehicle from a preceding vehicle when the following distance is displayed by means of the status of multiple blocks.

In order to achieve the above object, a vehicle-mounted display device is proposed which is characterized in that, the display device for displaying the following distance of a vehicle from a preceding vehicle by means of the status of multiple blocks which are arranged in the direction of the following distance, includes sub-blocks having the same length in the direction of the following distance as that of the multiple blocks, the sub-blocks being placed along the side of the multiple blocks.

With the above arrangement, since the sub-blocks having the same length in the direction of the following distance as that of the multiple blocks, are placed along the side of the multiple blocks which are arranged in the direction of the following distance in order to display the following distance of the vehicle from a preceding vehicle, the driver can easily recognize the total number of blocks by means of the sub-blocks and can achieve easy recognition of the following distance on the basis of the status of the blocks, thus preventing the occurrence of erroneous recognition.

In accordance with another aspect of the invention, a vehicle-mounted display device is proposed which is characterized in that, the multiple blocks can be switched between a display state and a non-display state according to the following distance, and the sub-blocks are constantly in a display state regardless of the status of the multiple blocks.

With the above arrangement, since the sub-blocks are constantly in a display state and the multiple blocks can be switched between a display state and a non-display state according to the following distance, by comparing the number of multiple blocks in a display state with the number of sub-blocks in a display state, recognition of the following distance can be made yet easier, thus effectively preventing the occurrence of erroneous recognition.

In accordance with a further aspect of the invention, a vehicle-mounted mounted display device is proposed which is characterized in that, the number of the multiple blocks is the same as that of the sub-blocks.

With the above arrangement, since the number of the multiple blocks is the same as the sub-blocks, the total number of multiple blocks can be infallibly recognized on the basis of the total number of sub-blocks.

In accordance with still another aspect of the invention, a vehicle mounted mounted display device is proposed which is characterized in that the number of the multiple blocks is three; and when three blocks are in a display state, it means that the following distance is 'long', when two blocks are in a display state, it means that the following distance is 'medium', and when one block is in a display state, it means that the following distance is 'short'.

With the above arrangement, since a 'long' following distance, a 'medium' following distance and a 'short' following distance are shown by switching the three blocks between a display state and a non-display state, the driver can recognize the target following distance at a glance.

In addition, the following distance in the present invention includes the following time. The following time is defined as the time required for the vehicle to reach the current position of a preceding vehicle.

BRIEF DESCRIPTION OF THE DRAWINGS

FIGS. 1 to FIG. 8 illustrate a first embodiment of the present invention.

DETAILED DESCRIPTION OF THE PREFERRED EMBODIMENT

Figure 1:
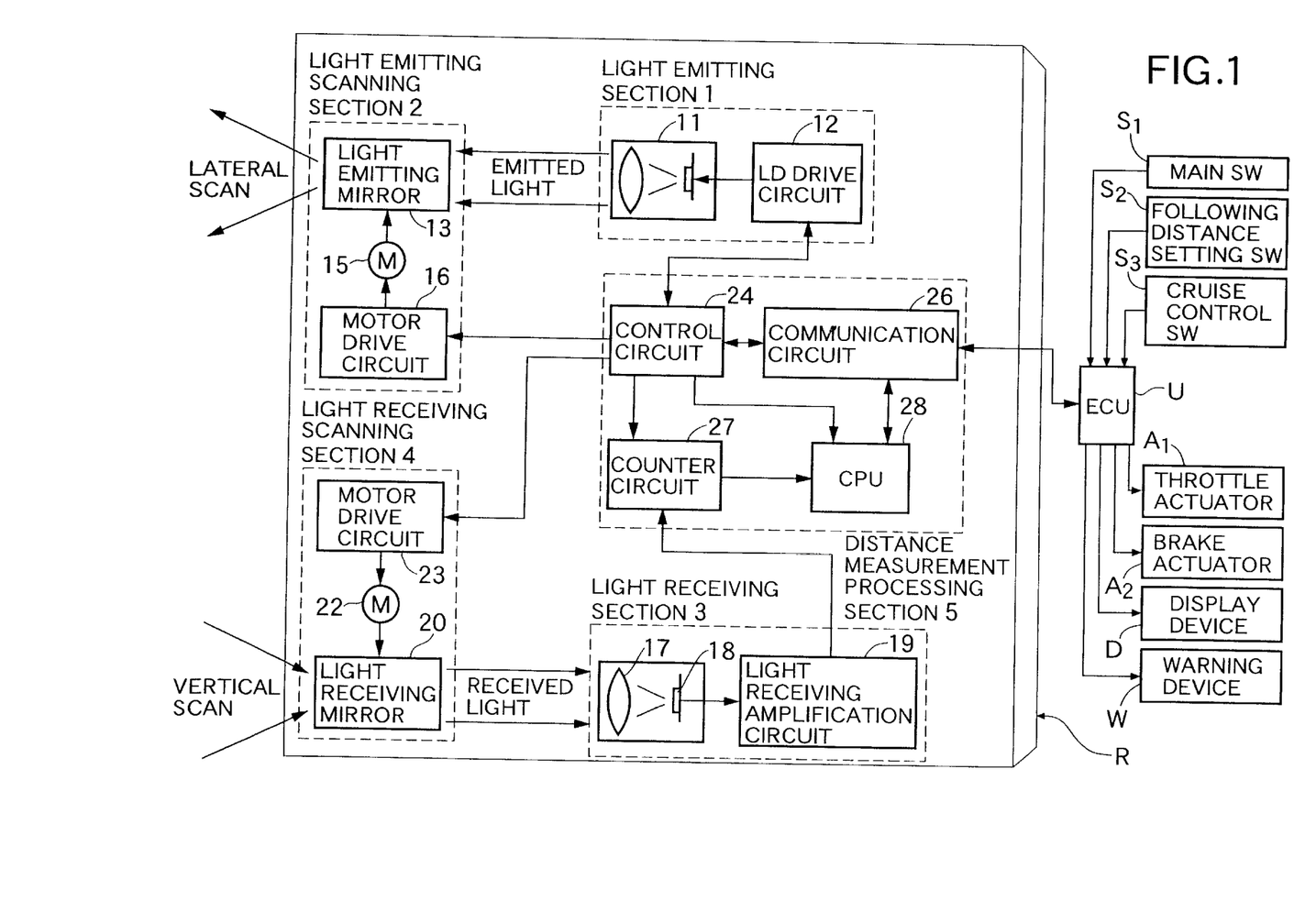
FIG. 1 is a block diagram illustrating the entire arrangement of an ACC system.

FIG. 1 is a block diagram illustrating the entire arrangement of an ACC system (Adaptive Cruise Control System; following distance control/vehicle speed control constant speed travel device) equipped with the vehicle-mounted display device of the present invention. An electronic control unit U for the ACC system is connected to a laser radar device R, a throttle actuator $A_1$, a brake actuator $A_2$, a display device D, a warning device W, a main switch $S_1$, a following distance setting switch $S_2$ and a cruise control switch $S_3$. In accordance with the ACC system, when a preceding vehicle is not detected by the laser radar device R, constant speed travel control can be carried out, in which the vehicle travels while maintaining a pre-set vehicle speed, by controlling the throttle actuator $A_1$ or the brake actuator $A_2$. When a preceding vehicle is detected by the laser radar device R, automatic tracking control can be carried out, in which the vehicle travels while maintaining a following distance from the preceding vehicle which is pre-set by the driver, by controlling the throttle actuator $A_1$ or the brake actuator $A_2$.

The display device D which is described in detail below is positioned below a speedometer or a tachometer provided on a meter panel, and includes a means for displaying the following distance that is set by the ACC system using a liquid crystal display. The warning device W gives various types of warnings to a driver using electronic sounds, and these also include warnings relating to the ACC system. For example, when the laser radar device R detects a preceding vehicle or loses sight thereof, or when the driver depresses the accelerator pedal during tracking control and the operation of the ACC system is cancelled, a warning sound comprising, for example, a single sound, is produced. When the operation of the ACC system is cancelled due to a malfunction or deteriorating travel conditions, or when the vehicle approaches the preceding vehicle too closely during tracking control and it becomes necessary for the driver to actively carry out a braking operation, a warning sound comprising, for example, a continuous sound, is produced.

Figure 2:
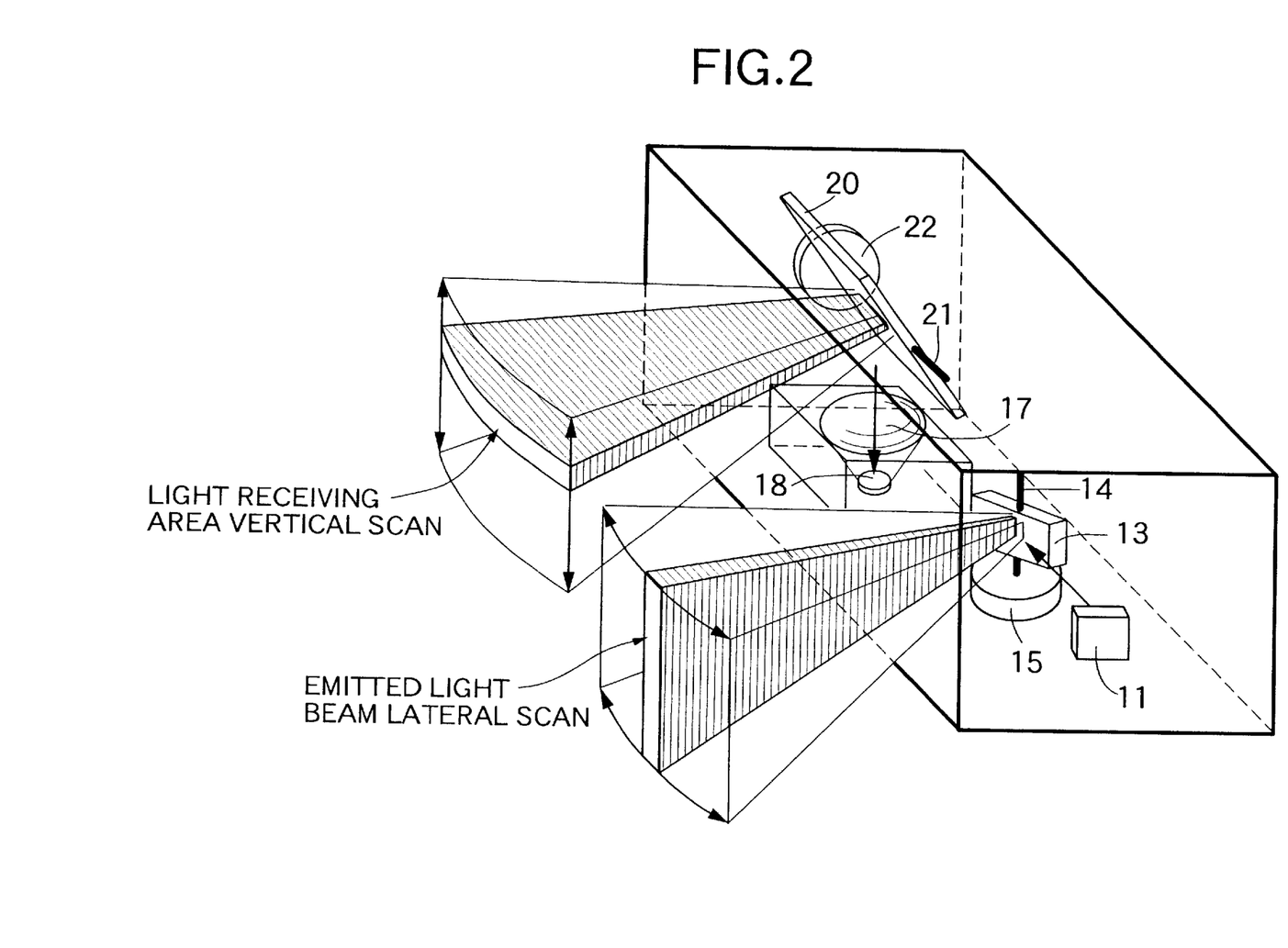
FIG. 2 is a perspective view of a laser radar device.

The structure of the laser radar device R is explained below by reference to FIG. 1 and FIG. 2.

The laser radar device R comprises a light emitting section 1, a light emitting scanning section 2, a light receiving section 3, a light receiving scanning section 4 and a distance measurement processing section 5. The light emitting section 1 comprises a laser diode 11 which has an integral light emitting lens and a laser diode drive circuit 12 for driving the laser diode 11. The light emitting scanning section 2 comprises a light emitting mirror 13 for reflecting the laser light emitted from the laser diode 11, a motor 15 for rotating the light emitting mirror 13 in a reciprocating manner around a vertical axis 14 and a motor drive circuit 16 for controlling the drive of the motor 15. The light beam emitted from the light emitting mirror 13 has a vertically elongated pattern with a restricted lateral width, and it moves in a reciprocating manner in the lateral direction in a predetermined cycle so as to scan preceding vehicles.

The light receiving section 3 comprises a light receiving lens 17, a photodiode 18 for receiving reflected lightwaves converged by the light receiving lens 17 and converting them to an electrical signal, and a light receiving amplification circuit 19 for amplifying the output signal from the photodiode 18. The light receiving scanning section 4 comprises a light receiving mirror 20 for reflecting the lightwaves reflected from a preceding vehicle and guiding them to the photodiode 18, a motor 22 for rotating the light receiving mirror 20 in a reciprocal manner around a lateral axis 21 and a motor drive circuit 23 for controlling the drive of the motor 22. The light receiving area having a laterally elongated pattern with a restricted vertical width moves in a reciprocating manner in a vertical direction in a predetermined cycle by means of the light receiving mirror 20 so as to scan preceding vehicles.

The distance measurement processing section 5 comprises a control circuit 24 for controlling the laser diode drive circuit 12 and motor drive circuits 16, 23, a communication circuit 26 for carrying out communication with the electronic control unit U, a counter circuit 27 for counting the time taken from the emission of the laser beam to the reception thereof and a central arithmetic processing device 28 for calculating the distance from and the direction to the preceding vehicle.

The area covered by the vertically elongated light emitting beam and the laterally elongated light receiving area thus becomes a transient detection area, and this detection area scans for preceding vehicles by moving in a zigzag manner over the whole detection region having a lateral width equal to the lateral scan width of the light emitting beam and a vertical width equal to the vertical scan width of the light receiving area. The distance up to a preceding vehicle is determined on the basis of the period from the time when the light emitting beam is emitted to the time when the light emitting beam is reflected from the preceding vehicle and the reflected wave is received. The direction of the preceding vehicle is determined on the basis of the direction of the transient detection area at that time. When the following distance from a preceding vehicle which is present in front of the vehicle is detected, data regarding the following distance is input to the electronic control unit U of the ACC system and used for automatic tracking control for maintaining a constant following distance.

Figure 3:
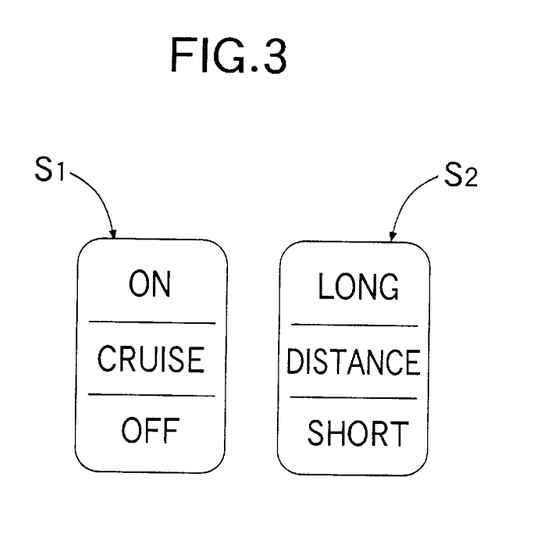
FIG. 3 is a diagram illustrating a main switch and a following distance setting switch.

A main switch $S_1$ and a following distance setting switch $S_2$ shown in FIG. 3, are both rocker type switches and are provided on an instrument panel on the right-hand side of a steering wheel. Pushing on the upper part of the main switch $S_1$ turns the ACC system ON, and pushing on the lower part turns the ACC system OFF. In the ACC system, the following distance can be set at the three levels 'long', 'medium' and 'short'; when the lower part of the following distance setting switch $S_2$ is pushed, the set following distance is switched in the direction of 'long'→'medium'→'short' and when the upper part is pushed the set following distance is switched in the direction of 'short'→'medium'→'long'.

In the present invention the following distance is set based on the following time. The following time is defined as the time taken for the vehicle to reach the current position of a preceding vehicle. A 'long' following distance corresponds to a following time of 2.5 sec, a 'medium' following distance corresponds to a following time of 2.1 sec and a 'short' following distance corresponds to a following time of 1.7 sec. Even when the following time is constant, the corresponding following distance increases according to an increase in the vehicle speed of the vehicle. For example, when the vehicle speed of the vehicle is 100 km/h, a following time of 2.5 sec corresponds to a following distance of about 70 m and a following time of 1.7 sec corresponds to a following distance of about 50 m.

Figure 4:
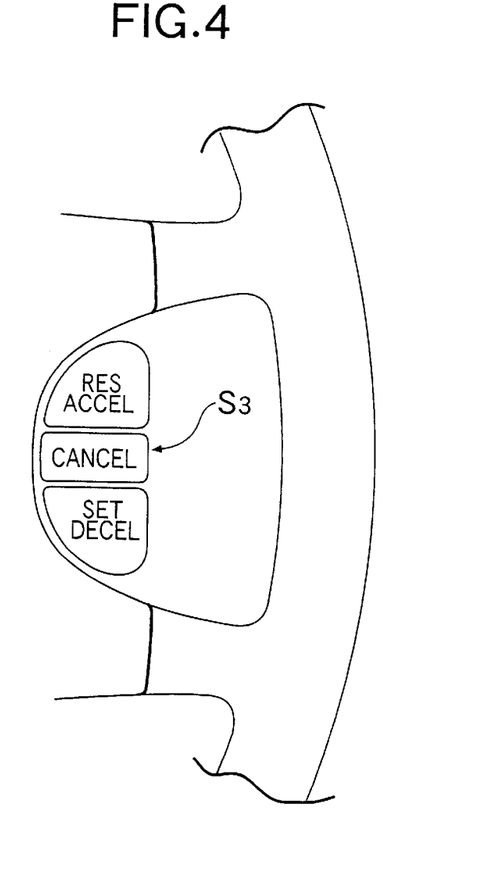
FIG. 4 is a diagram illustrating a cruise control switch.

As shown in FIG. 4, a cruise control switch $S_3$ provided on the steering wheel comprises a RES/ACCEL switch, a CANCEL switch and a SET/DECEL switch. The RES/ACCEL switch is operated when the vehicle speed set for the constant speed travel control is to be increased and when the vehicle is accelerated to a previously set vehicle speed when resuming a suspended constant speed travel control. The CANCEL switch is operated when the operation of the ACC system is actively suspended. The SET/DECEL switch is operated when the operation of the ACC system is started using the vehicle speed at that time as the set vehicle speed and when the set vehicle speed of the constant speed travel control is to be decreased.

The structure of the display device D is explained below by reference to FIG. 5.

The purpose of the display device D provided on the meter panel is to supply the driver with various types of information by means of a liquid crystal display. A cooling water temperature display part 31 is positioned on the top right-hand side, a display part 32 for the amount of fuel remaining is positioned on the top left-hand side, and a trip meter 33 is positioned on the bottom right-hand side. A following distance display part 34 is positioned at the bottom center, and a set vehicle speed display part 35 and an automatic system OFF display part 36 are positioned on the bottom left-hand side. In the vicinity of the display device D a green lamp 37 is provided for displaying the operating status of the ACC system and an amber lamp 38 is provided for displaying a malfunction.

Figure 5:
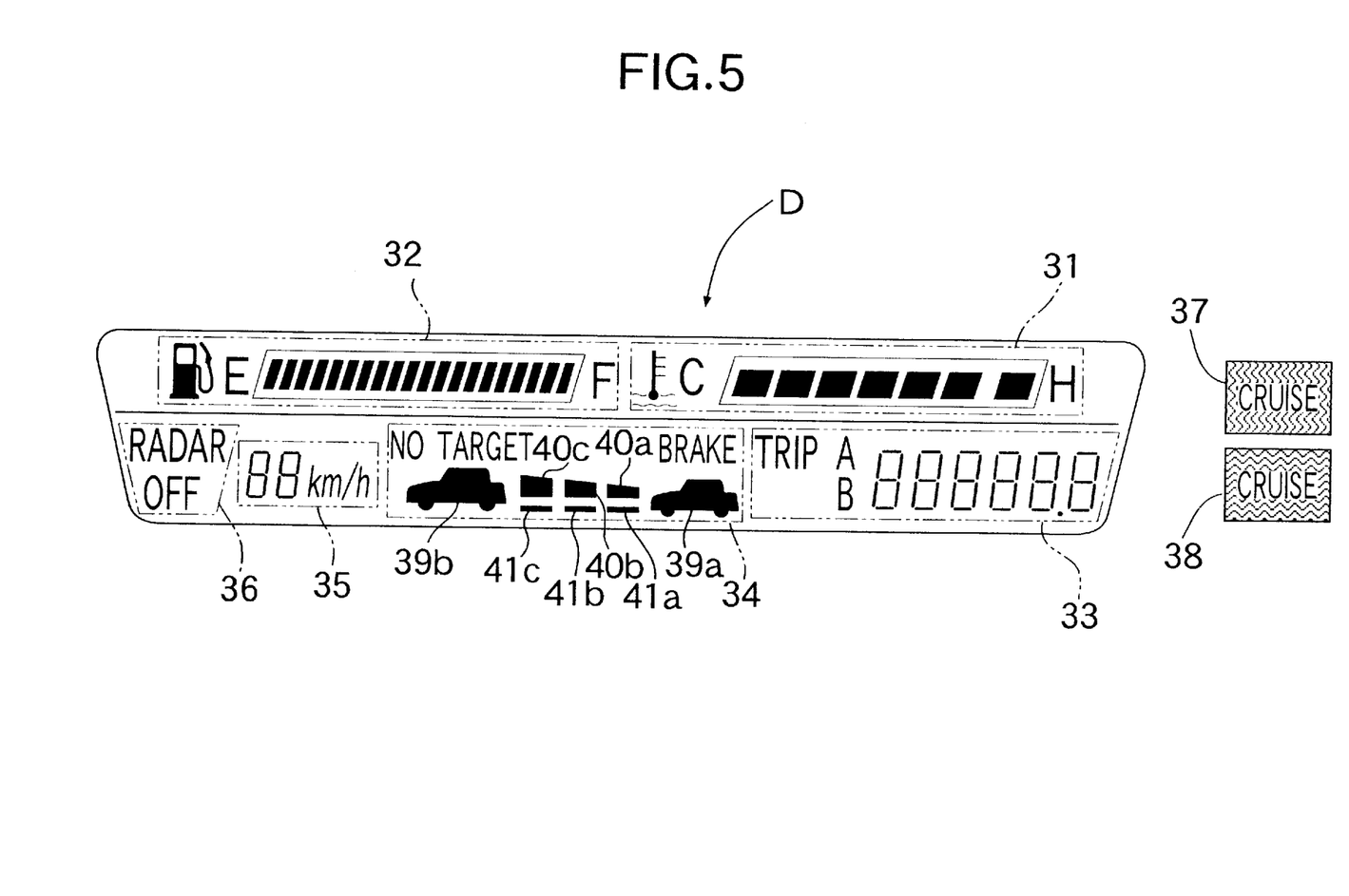
FIG. 5 is a diagram illustrating a display device provided on a meter panel.
Figure 6A:
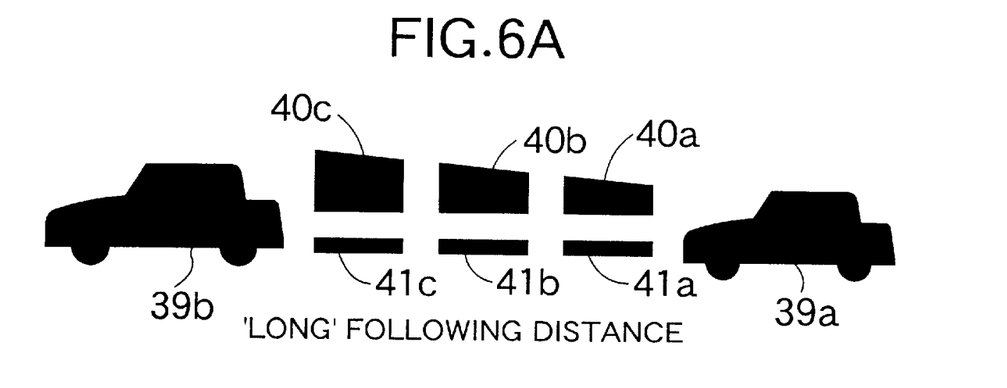
FIGS. 6A–6C are diagrams illustrating a following distance display area of the display device.
Figure 6B:
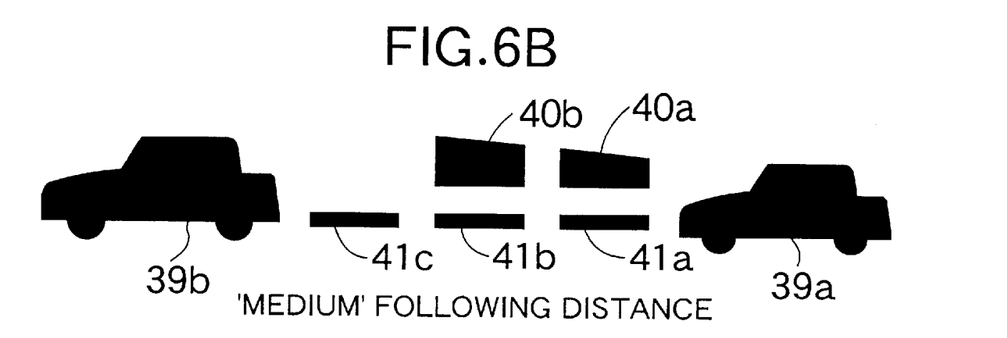
Figure 6C:
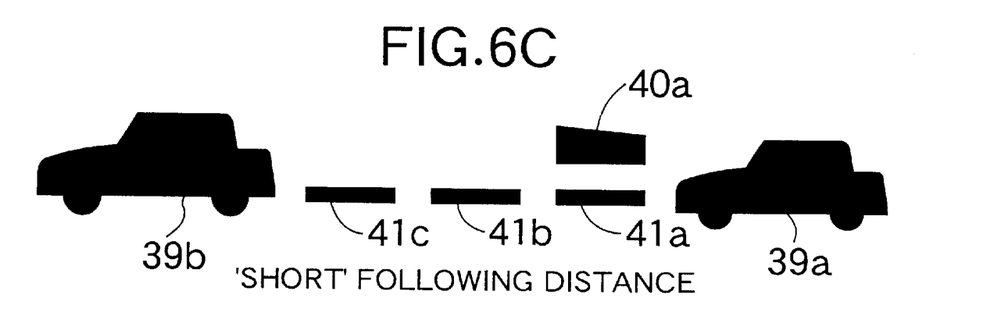

As shown in FIG. 5 and FIG. 6 the following distance display part 34 has three trapezoidal blocks 40a, 40b, 40c which are positioned in tandem between a vehicle symbol 39a on the right-hand side and a preceding vehicle symbol 39b on the left-hand side and three bar-shaped sub-blocks 41a, 41b, 41c having the same length as that of the three blocks 40a, 40b, 40c are positioned in tandem so as to abut the lower parts of the blocks 40a, 40b, 40c.

The operation of the display device D is explained below.

Figure 7:
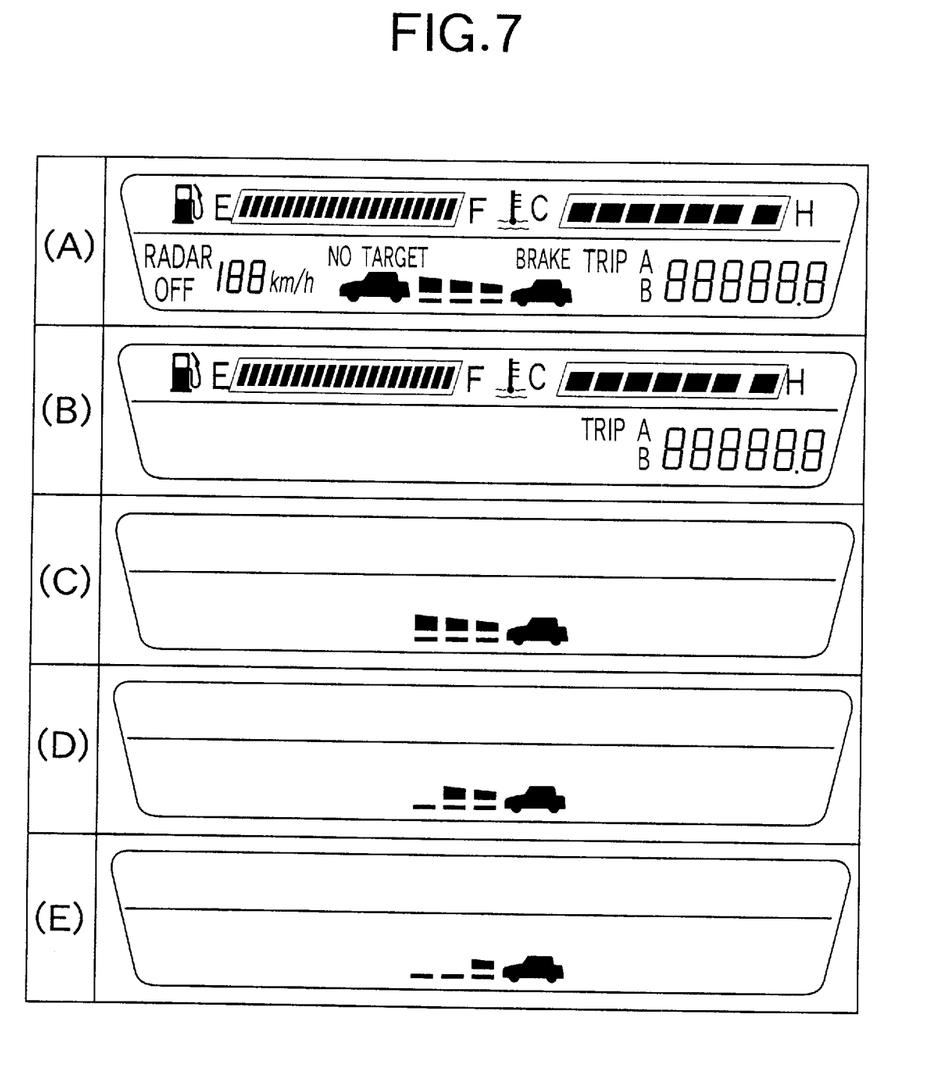
FIG. 7 and FIG. 8 are diagrams illustrating display examples of the display device.

When the ignition switch is turned ON, the cooling water temperature display part 31, the display part 32 for the amount of fuel remaining, the trip meter 33, the following distance display part 34, the set vehicle speed display part 35 and the automatic system OFF display part 36 of the display device D are all displayed (see FIG. 7, (A)), and at the same time the green lamp 37 and the amber lamp 38 are illuminated. After the initial state has lasted for about 1 second, the following distance display part 34, the set vehicle speed display part 35 and the automatic system OFF display part 36 which are related to the ACC system change to a non-display state (see FIG. 7, (B)), and the green lamp 37 and the amber lamp 38 are turned off. Therefore, during normal travel when the ACC system is not in operation, only the cooling water temperature display part 31, the display part 32 for the amount of fuel remaining and the trip meter 33 are in a display state (see FIG. 7, (B)).

When the main switch $S_1$ (see FIG. 3) is turned ON to start the ACC system operating, among the following distance display part 34, the set vehicle speed display part 35 and the automatic system OFF display part 36 which are related to the ACC system, only the following distance display part 34 is in a state in which it is displayed. At this stage the currently set following distance is displayed by the following distance display part 34 (see FIGS. 7, (C) to (E)). More specifically, when the ACC system starts operating for the first time after the ignition switch (not illustrated) is turned ON, the following distance display part 34 displays a 'long' following distance. When the ACC system is resumed after suspension of its operation, the following distance which had been set the last time it was operating is displayed. In FIGS. 7, (C) to (E) and FIG. 8 which are described later, illustration of the cooling water temperature display part 31, the fuel remaining amount display part 32 and the trip meter 33 which are not directly related to the ACC system are not displayed for the sake of simplicity.

As is clear from FIG. 6 and FIG. 7, the vehicle symbol 39a and the three sub-blocks 41a, 41b, 41c are always in a display state during operation of the ACC system, but the display status of the three blocks 40a, 40b, 40c changes according to the following distance that is set. That is, when the following distance is 'long', all of the three blocks 40a, 40b, 40c are in a display state (see FIG. 6A), when the following distance is 'medium', the right-hand and central blocks 40a, 40b are in a display state and the left-hand block 40c is in a non-display state (see FIG. 6B), and when the following distance is 'short', the right-hand block 40a is in a display state and the central and left-hand blocks 40b, 40c are in a non-display state (see FIG. 6C).

Thus, by switching the three blocks 40a, 40b, 40c between a display state and a non-display state it is possible for the driver to recognize the following distance that has been set at a glance on the basis of the number of displayed blocks 40a, 40b, 40c. In particular, since the three sub-blocks 41a, 41b, 41c corresponding to the three blocks 40a, 40b, 40c respectively are always in a display state, the driver can infallibly recognize that the total number of the blocks 40a, 40b, 40c is three and can infallibly recognize the following distance that is set on the basis of a comparison of the number of blocks 40a, 40b, 40c that are in a display state relative to the total number thereof. For example, as shown in FIG. 6 B, when the two blocks 40a, 40b are in a display state, by comparison with the three sub-blocks 41a, 41b, 41c which are in a display state, it is recognized that two out of the total of three blocks 40a, 40b, 40c are in a display state and thus the driver can be easily and infallibly informed that the following distance is 'medium'.

Figure 8:
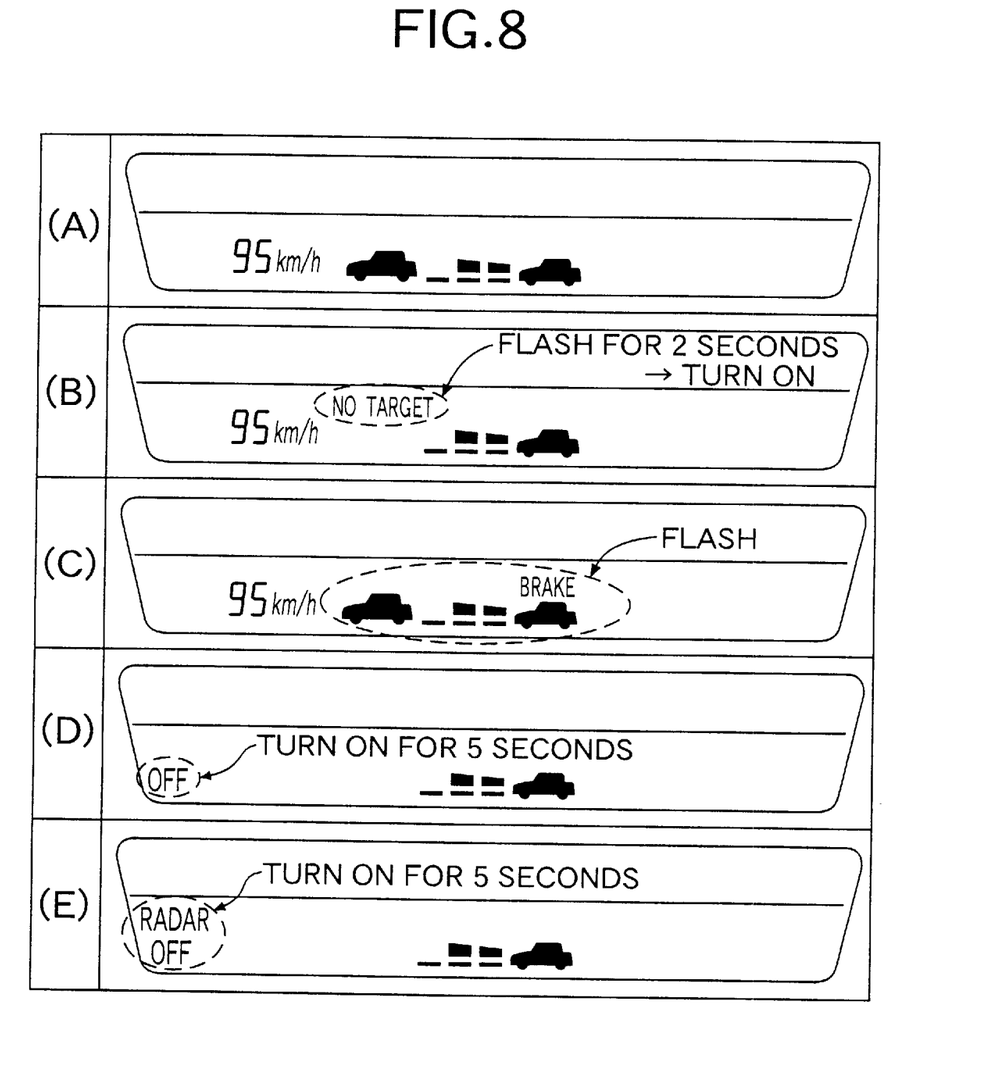

When the laser radar device R detects a preceding vehicle and automatic tracking control is being carried out, the following distance display part 34 displays the preceding vehicle symbol 39b in addition to the vehicle symbol 39a and, the currently set vehicle speed is displayed on the set vehicle speed display part 35 (see FIG. 8, (A)). When detection of the preceding vehicle by the laser radar device R is lost due to, for example, the preceding vehicle changing its lane or moving into a side road, the preceding vehicle symbol 39b changes to a non-display state, the words 'NO TARGET' flash for 2 seconds and then changes to a display state (see FIG. 8, (B)). At this stage, if the driver operates the RES/ACCEL switch of the cruise control switch $S_3$ (see FIG. 4) so as to resume acceleration, the set speed displayed on the set vehicle speed display part 35 flashes. Furthermore, when the vehicle approaches a preceding vehicle too closely or the ABS starts to operate, the vehicle symbol 39a, the preceding vehicle symbol 39b, the blocks 40a, 40b, 40c and the sub-blocks 41a, 41b, 41c including the word 'BRAKE' of the following distance display part 34 flash and the warning device W outputs a warning sound (see FIG. 8, (C)).

When the vehicle speed moves outside the usable vehicle speed range (65 km/h to 110 km/h), when the detection conditions for the laser radar device R deteriorate due to dense fog, etc., or when a malfunction occurs during the operation of the ACC system, the operation of the ACC system is cancelled, the word 'OFF' in the automatic system OFF display part 36 is displayed for 5 seconds and at the same time the green lamp 37 (see FIG. 5) flashes and then turns off (see FIG. 8, (D)). Moreover, when detection of the preceding vehicle with good precision becomes impossible due to dirt on the laser radar device R during operation of the ACC system, the operation of the ACC system is cancelled, the words 'RADAR OFF' in the automatic system OFF display part 36 are displayed for 5 seconds and at the same time the green lamp 37 flashes and then turns off (see FIG. 8, (E)). In these cases the warning device W also outputs a warning sound.

During the time when automatic braking is carried out by the brake actuator $A_2$ (see FIG. 1), when operation of the ACC system is cancelled due to the occurrence of an abnormality such as inadequate performance, as in the following distance display part 34 shown in FIG. 8, (C), the vehicle symbol 39a, the preceding vehicle symbol 39b, the blocks 40a, 40b, 40c and the sub-blocks 41a, 41b, 41c including the words of 'BRAKE' of the following distance display part 34 start flashing.

When automatic cancellation of the ACC system is complete, the display device D returns to the state shown in FIG. 7, (B) and at the same time the amber lamp 38 (see FIG. 5) flashes.

Figure 9A:
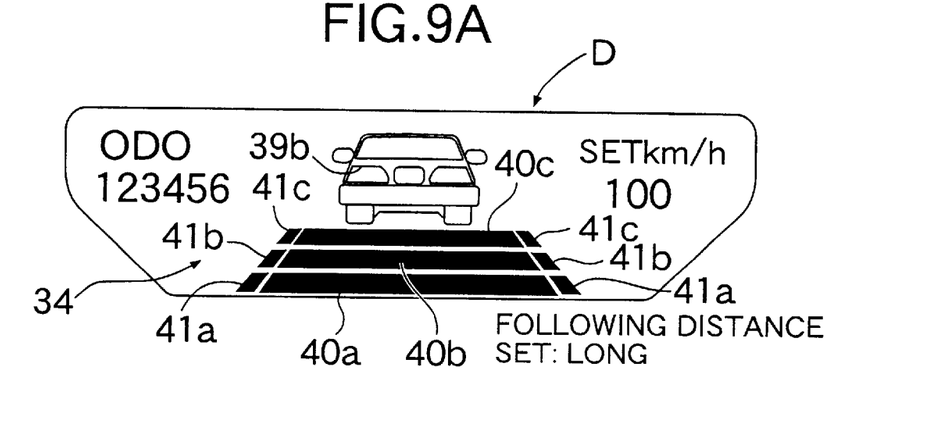
FIGS. 9A–9C illustrate a second embodiment of a display device of the present invention.
Figure 9B:
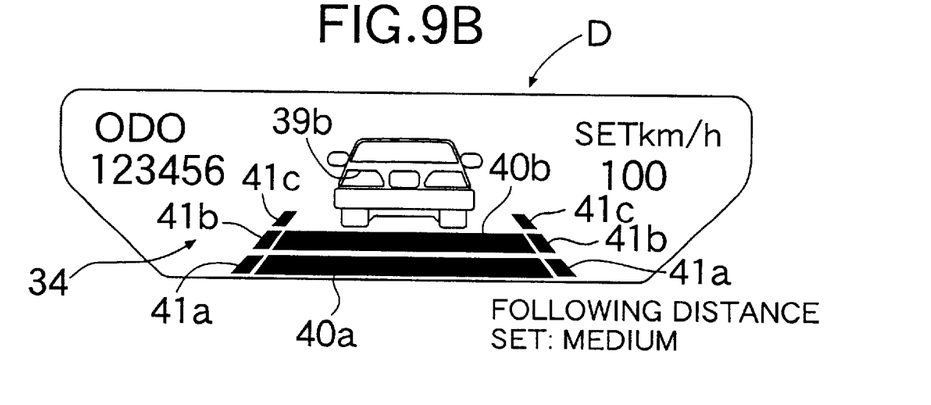
Figure 9C:
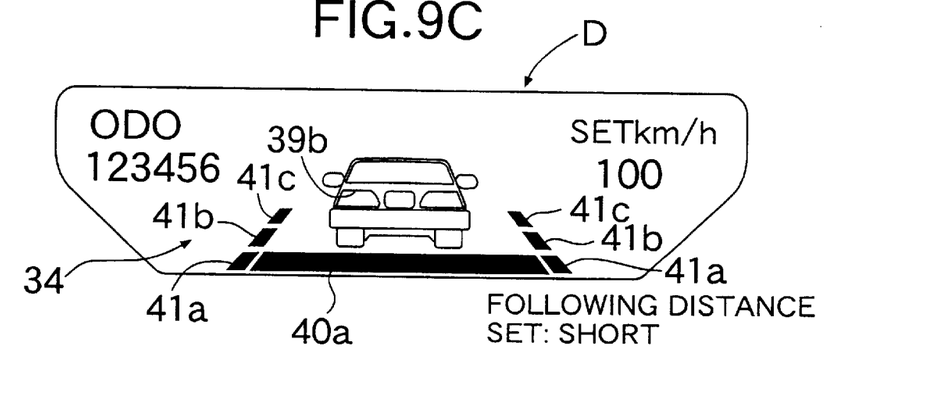

A second embodiment of the present invention is explained below by reference to FIG. 9.

The following distance display part 34 of the second embodiment simulates the state of a preceding vehicle as viewed by the driver of the vehicle, and the three blocks 40a to 40c comprise thick lines which extend in the lateral direction and are positioned at the rear of the preceding vehicle symbol 39b. The three sub-blocks 41a to 41c comprising three narrow lines which extend in tandem in the direction of the following distance are positioned at the right-and left-hand ends of the three blocks 40a to 40c. Each of the three right and left sub-blocks 41a to 41c is always displayed, but the three blocks 40a, 40b, 40c change their display status according to the following distance that is set. That is to say, when the following distance is 'long', all of the three blocks 40a, 40b, 40c are in a display state (see FIG. 9A), when the following distance is 'medium', the lower and central blocks 40a, 40b are in a display state and the upper block 40c is in a non-display state (see FIG. 9B), and when the following distance is 'short', only the lower block 40a is in a display state and the central and upper blocks 40b, 40c are in a non-display state (see FIG. 9C).

Thus, also in accordance with the present second embodiment, it is possible to achieve the same functional effects as those of the first embodiment.

In the embodiments the display device D of the ACC system is illustrated as an example, but the present invention can be applied to a following distance warning system, a collision damage reduction braking system, etc. The following distance displayed on the display device D is not limited to the following distance that is set, and it may be actual following distance. Moreover, the number of blocks is not limited to 3. Furthermore, the vehicle and the preceding vehicle of the present invention are not limited to four-wheel drive vehicles, and it can be applied to two-wheel drive vehicles, general purpose vehicles, etc.

Since sub-blocks having the same length in the direction of the following distance as that of the blocks and are placed along the side of the blocks which are arranged in the direction of the following distance in order to display the following distance of the vehicle from a preceding vehicle, the driver can easily recognize the total number of blocks by means of the subblocks and can thus easily recognize the following distance on the basis of the status of the blocks, thus preventing the occurrence of erroneous recognition.

Since the sub-blocks are constantly in a display state and the blocks can be switched between a display state and a non-display state according to the following distance, by comparing the number of blocks in a display state with the number of sub-blocks in a display state, recognition of the following distance can be made easier, thus effectively preventing the occurrence of erroneous recognition.

Since the number of blocks is the same as that of the sub-blocks, the total number of blocks can be infallibly recognized on the basis of the total number of sub-blocks.

Since a 'long' following distance, a 'medium' following distance and a 'short' following distance are shown by switching the three blocks between a display state and a non-display state, the driver can recognize the target following distance at a glance.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A vehicle-mounted display device for displaying the following distance of a vehicle from a preceding vehicle, said display device comprising:

multiple blocks arranged in the direction of the following distance, and sub-blocks having the same length in the direction of the following distance as the length of the multiple blocks, wherein the sub-blocks are positioned along the side of the multiple blocks in order to enable a clear visual recognition of the following distance according to the multiple blocks.

2. A vehicle-mounted display device according to claim 1, wherein the multiple blocks can be switched between a display state and a non-display state according to the following distance, and wherein the sub-blocks are constantly in a display state regardless of the status of the multiple blocks.

3. A vehicle-mounted display device according to claim 1 or 2, wherein the number of the multiple blocks is the same as the number of the sub-blocks.

4. A vehicle-mounted display device according to claim 1 or 2, wherein the number of the multiple blocks is three; and wherein three blocks in a display state, indicates the following distance is 'long', two blocks in a display state, indicates the following distance is 'medium', and one block in a display state, indicates the following distance is 'short'.

* * * * *